US011518857B2

(12) United States Patent
Yabumoto et al.

(10) Patent No.: US 11,518,857 B2
(45) Date of Patent: Dec. 6, 2022

(54) SIZING AGENT FOR REINFORCEMENT FIBER AND APPLICATIONS THEREOF

(71) Applicant: MATSUMOTO YUSHI-SEIYAKU CO., LTD., Yao (JP)

(72) Inventors: Atsushi Yabumoto, Yao (JP); Kentaro Suzuki, Yao (JP); Takeyoshi Nakayama, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 321 days.

(21) Appl. No.: 16/645,307

(22) PCT Filed: Aug. 7, 2018

(86) PCT No.: PCT/JP2018/029514
§ 371 (c)(1),
(2) Date: Mar. 6, 2020

(87) PCT Pub. No.: WO2019/049581
PCT Pub. Date: Mar. 14, 2019

(65) Prior Publication Data
US 2021/0122888 A1 Apr. 29, 2021

(30) Foreign Application Priority Data

Sep. 8, 2017 (JP) .............................. JP2017-172599

(51) Int. Cl.
*C08J 5/06* (2006.01)
*C08J 5/04* (2006.01)
*D06M 15/59* (2006.01)
*D06M 101/40* (2006.01)

(52) U.S. Cl.
CPC .................. *C08J 5/06* (2013.01); *C08J 5/042* (2013.01); *D06M 15/59* (2013.01); *C08J 2477/06* (2013.01); *D06M 2101/40* (2013.01)

(58) Field of Classification Search
CPC . C08J 5/06; C08J 5/042; C08J 2477/06; C08J 2300/22; D06M 15/59; D06M 2101/40; D06M 13/432
USPC .......................................................... 523/206
See application file for complete search history.

(56) References Cited

U.S. PATENT DOCUMENTS

| 4,218,351 A * | 8/1980 | Rasmussen ............ C08G 69/26 528/335 |
| 5,318,847 A | 6/1994 | Fukushima et al. |
| 5,728,432 A | 3/1998 | Imashiro et al. |
| 2005/0271874 A1 | 12/2005 | Sakajiri et al. |
| 2007/0155877 A1 | 7/2007 | Shinohara |
| 2015/0010745 A1 * | 1/2015 | Chieng ............... C09D 115/005 524/428 |
| 2017/0145627 A1 * | 5/2017 | Sakurai ................. D06M 15/59 |

FOREIGN PATENT DOCUMENTS

| CN | 1692199 A | 11/2005 |
| CN | 107022901 A | 8/2017 |
| JP | 05-004348 B2 | 1/1993 |
| JP | 05-263363 A | 10/1993 |
| JP | 05-311069 A | 11/1993 |
| JP | 08-059303 A | 3/1996 |
| JP | 2007-131959 A | 5/2007 |
| JP | 4229534 B2 | 2/2009 |
| JP | 2009-517500 A | 4/2009 |
| JP | 2013-87396 A | 5/2013 |
| JP | 2013-129946 A | 7/2013 |
| JP | 2015-074837 A | 4/2015 |
| WO | 2015/049567 A1 | 4/2015 |
| WO | 2015/194457 A1 | 12/2015 |

OTHER PUBLICATIONS

International Search Report received in International Application No. PCT/JP2018/029514, dated Oct. 16, 2018.
Communication dated Nov. 29, 2021 from the China National Intellectual Property Administration in corresponding Chinese Application No. 201880057751.3.
Office Action dated Aug. 11, 2022 issued by China National Intellectual Property Administration in Machine Chinese Application No. 201880057751.3.

* cited by examiner

*Primary Examiner* — Hannah J Pak
(74) *Attorney, Agent, or Firm* — Sughrue Mion, PLLC

(57) ABSTRACT

A sizing agent for matrix-resin-reinforcement fibers that simultaneously attains excellent cohesion and abrasion resistance of sized fibers, uniform size application on fiber surface and good bonding between sized fiber and a matrix resin; a synthetic fiber strand sized therewith; and a fiber-reinforced composite material reinforced by the sized fiber strand. The sizing agent contains a polyamide (A), a carbodiimide group-containing compound (B) and water (C), wherein the polyamide (A) has a melt viscosity ranging from 100 to 15,000 mPa·s at 150° C. and the compound (B) has at least two carbodiimide groups per molecule. The polyamide (A) is preferably a water-soluble polyamide.

11 Claims, No Drawings

SIZING AGENT FOR REINFORCEMENT FIBER AND APPLICATIONS THEREOF

CROSS-REFERENCE TO RELATED APPLICATIONS

This application is a § 371 of International Application No. PCT/JP2018/029514 filed Aug. 7, 2018, claiming priority based on Japanese Patent Application No. 2017-172599 filed Sep. 8, 2017.

BACKGROUND OF THE INVENTION

1. Field of the Invention

The present invention relates to a sizing agent for reinforcement fiber and applications thereof. Specifically, the present invention relates to a sizing agent for reinforcement fiber employed for reinforcement of a matrix resin, a synthetic fiber strand applied with the sizing agent, and a fiber-reinforced composite material manufactured from the sized fiber strand.

2. Description of the Related Art

Reinforcement fibers are often used in a form of chopped fiber cut into 1 to 15 mm lengths for manufacturing fiber-reinforced composite materials of thermoplastic resins, such as polyolefin resins, polyamide resins, polycarbonate resins, polyacetal resins, ABS resins, polyphenylene sulfide resins and polyetherimide resins. These fibers are included in the matrix resins mentioned above, and attract attention because of their good moldability and advantages in recycling. The chopped fiber should have sufficient cohesion when it is kneaded with a thermoplastic resin to be manufactured into pellets. This is because chopped fiber having insufficient cohesion may be fed at a varying rate during pellet manufacturing or may break to deteriorate the properties of the resultant fiber-reinforced composite materials. For preventing such problems, a number of techniques for coating reinforcement fibers with sizing agents formulated of various thermoplastic resins as a main component have been proposed in order to impart optimum cohesion to reinforcement fibers (refer to Patent Literature 1), and are widely employed in industrial fields.

Some reinforcement fibers have low elasticity and brittleness. Such reinforcement fibers applied with conventional sizing agents have sometimes caused problems, such as fluffs and broken fiber due to mechanical friction to which the fibers are subjected in processing.

For achieving good to excellent properties of fiber-reinforced composite materials, sufficient bonding between a sizing agent and a matrix resin and uniform application of the sizing agent on fiber are indispensable. For example, patent literature 2 proposes a sizing agent containing a thermoplastic component which has a good handling property and exhibits good bonding to matrix resins. However, the sizing agent disclosed therein poses problems, such as increased facility cost and decreased productivity, because the sizing agent requires additional heat treatment after drying.

For achieving high bonding strength and film strength of a sizing agent, the resins contained in a sizing agent necessarily have a high molecular weight (refer to patent literature 3). Such sizing agents, however, have low fluidity caused by high viscosity due to the high-molecular weight of the resins in the sizing agent. Thus, the sizing agent cannot sufficiently wet the fiber surface, and fails to uniformly coat the fiber surface when applied to fibers. In other words, the bonding between a sizing agent and the matrix resin contradicts the fiber wetting and uniform fiber coating performance of the sizing agent. Thus conventional sizing agents cannot simultaneously satisfy all of these requisite properties including good cohesion and abrasion resistance of sized fibers, uniform application of a sizing agent on fiber and good bonding between sized fiber and matrix resins. These properties are required in the present situation where fiber-reinforced composite materials are used in various fields and applications, and the composite materials are required to have higher mechanical strength.

[PTL 1] Japanese Unexamined Patent Application Publication 2007-131959
[PTL 2] Japanese Examined Patent Application Publication 1993-004348
[PTL 3] Japanese Patent 4229534

SUMMARY OF THE INVENTION

In view of the above conventional technical background, an object of the present invention is to provide a sizing agent for a matrix-resin-reinforcement fibers that simultaneously attains excellent cohesion and abrasion resistance of sized fibers, uniform size application on fiber surface and good bonding between sized fiber and a matrix resin; a synthetic fiber strand sized therewith; and a fiber-reinforced composite material reinforced by the sized fiber strand.

Upon diligent study directed towards solving the above problems of the related art, the present inventions found that the above objects have been achieved by providing a sizing agent for reinforcement fiber which contains a polyamide having a specific melt viscosity, a specific carbodiimide group-containing compound and water.

Specifically, the present invention provides a sizing agent for reinforcement fiber containing a polyamide (A), a carbodiimide group-containing compound (B) and water (C), wherein the polyamide (A) has a melt viscosity ranging from 100 to 15,000 mPa·s at 150° C. and the compound (B) has at least two carbodiimide groups per molecule.

The polyamide (A) is preferably a water-soluble polyamide. The polyamide (A) is preferably a condensation polymerization product of an amine and a carboxylic acid and has an oxyalkylene group. The weight ratio of the carbodiimide group-containing compound (B) to the polyamide (A), B:A, preferably ranges from 1 to 30 wt %.

The chemical formula weight of the carbodiimide group-containing compound (B) preferably ranges from 300 to 600 per 1 mole of the carbodiimide group.

The reinforcement fiber strand of the present invention is manufactured by applying the sizing agent for reinforcement fiber to a base reinforcement fiber strand. The base reinforcement fiber is preferably carbon fiber.

The fiber-reinforced composite material of the present invention comprises a matrix resin and the reinforcement fiber strand described above. The matrix resin is preferably a thermoplastic resin.

Advantageous Effects of Invention

The sizing agent for reinforcement fiber of the present invention simultaneously attains excellent cohesion and abrasion resistance of sized fibers, uniform size application on fiber surface and good bonding between sized fiber and a matrix resin.

DETAILED DESCRIPTION OF THE PREFERRED EMBODIMENTS

The components of the sizing agent for reinforcement fiber of the present invention are described in greater detail as follows.

Polyamide (A)

Polyamide (A) is a component of the sizing agent for reinforcement fiber of the present invention. This component contributes to good cohesion and abrasion resistance of sized fiber and uniform size application on fiber surface. Although the mechanism of the polyamide (A) which contributes to the good cohesion and abrasion resistance of sized fiber and uniform size application on fiber surface has not been clarified, the component is considered to form a film coating when dried to protect fiber strands and impart cohesion to fiber. In addition, the specific melt viscosity of the component is considered to contribute to high fluidity of the sizing agent that attains uniform size application on fiber surface and prevents fluffs.

The polyamide (A) has a melt viscosity preferably ranging from 100 to 15,000 mPa·s, more preferably from 500 to 10,000 mPa·s, and further more preferably from 1,000 to 8,000 mPa·s at 150° C. A melt viscosity lower than 100 mPa·s may result in low strength of the dried size film to cause insufficient fiber cohesion, while a melt viscosity higher than 15,000 mPa·s may result in poor fluidity to cause nonuniform size application on fiber and insufficient abrasion resistance of sized fiber.

The ratio between the carboxyl end group and amino end group of the polyamide (A) is not specifically restricted, and preferably ranges from 60:40 to 100:0, and more preferably from 70:30 to 90:10, for desirable reactivity of the polyamide with the carbodiimide compound described below. The amount of the end carboxyl group can be calculated from the acid value of the polyamide, while the amount of the amino end group can be calculated from the amine value of the polyamide.

Specific examples of the polyamide (A) include nylon 6, nylon 66, nylon 610, nylon 11, nylon 12, nylon 6/66 copolymer, nylon 6/610 copolymer, nylon 6/11 copolymer, nylon 6/12 copolymer, nylon 6/66/11 copolymer, nylon 6/66/12 copolymer, nylon 6/66/11/12 copolymer and nylon 6/66/610/11/12 copolymer. One of or a combination of at least two of the polymers and copolymers may be used. Among these polyamides, water-soluble polyamides are preferable to attain good stability and handling property of the sizing agent for reinforcement fiber of the present invention. Further, the water-soluble polyamides having an oxyalkylene group in the main chain of the polymer or copolymer are especially preferable. As used herein, water solubility means that at least 1 part of a polyamide completely dissolves in 100 parts of water at 20° C.

The polyamide (A) is produced by a known method, such as polycondensation of diamine, dicarboxylic acid and ω-amino-ω' carboxylic acid and ring scission polymerization of cyclic lactams. The polyamide can be readily produced using a specific amount of dicarboxylic or monocarboxylic acid as a polymerization regulator in the polycondensation or ring scission polymerization.

Specific examples of the diamine include amine end-located compounds, such as ethylene diamine, trimethylene diamine, tetramethylene diamine, pentamethylene diamine, hexamethylene diamine, 1,7-diaminoheptane, 1,8-diaminooctane, 1,9-diaminononae, 1,10-diaminodecane, phenylene diamine, m-xylylenediamine, diethylene glycolamine, triethylene glycoldiamine, tetraethylene glycoldiamine, dibutylene glycoldiamine, tributylene glycoldiamine, tetrabutylene glycoldiamine, polyethylene glycol and polypropylene glycol. Of those compounds, water-soluble polyamides having an oxyalkylene group in their main chain are preferable, and amine end-capped polyethylene glycols are more preferable.

Specific examples of the dicarboxylic acid include adipic acid, suberic acid, azelaic acid, sebacic acid, dodecanedioic acid, terephthalic acid, isophthalic acid, 2,6-naphthalene dicarboxylic acid, glutaric acid, pimelic acid, nonane dicarboxylic acid, decane dicarboxylic acid, tetradecane dicarboxylic acid, octadecane dicarboxylic acid, fumaric acid and xylylene dicarboxylic acid. Specific examples of the lactams include ε-caprolactam and ω-laurolactam, and specific examples of the aminocarboxylic acids include 6-aminocarboxylic acid, 11-aminoundecanoic acid and 12-aminododecanoic acid.

Specific examples of the dicarboxylic acids used as the polymerization regulator include the same as those included in the specific examples of the dicarboxylic acids mentioned above. Specific examples of the monocarboxylic acids include caproic acid, hetanoic acid, nonanoic acid, undecanoic acid and dodecanoic acid.

Carbodiimide Group-Containing Compound (B)

The carbodiimide group-containing compound (B) contributes to imparting cohesion to sized fiber and attaining sufficient bonding between sized fiber and matrix resins as the component of the sizing agent for reinforcement fiber of the present invention.

Carbodiimide compounds are generally known to self-cross-link when heated and react with active hydrogen compounds. When the sizing agent of the present invention is dried after application on reinforcement fiber, the carbodiimide groups self-cross-link and react with the end carboxyl groups and amino groups of the polyamide (A) to coat the fiber surface and contribute to improved fiber cohesion. In addition, the carbodiimide groups can react and bond with a matrix resin to improve the bonding between sized fiber and a matrix resin.

The carbodiimide compound for use in the present invention can be any of those dispersible in aqueous solvent with the aid of a dispersing agent. The examples of the carbodiimide compound include aromatic or aliphatic carbodiimide compounds represented by the general formula (1) shown below. Such carbodiimide compounds can be used as the carbodiimide compound of the sizing agent for reinforcement fiber of the present invention by dispersing the compounds in an aqueous solvent with the aid of emulsifiers and the like.

$$R^2-NCN-(R^1-NCN)_n-R^2 \qquad (1)$$

wherein $R^1$ represents the residue of a diisocyanate compound selected from the group consisting of m-tetramethylxylylene diisocyanate, p-tetramethylxylylene diisocyanate, 4,4'-dicyclohexylmethane diisocyanate, isophorone diisocyanate, 4,4'-diphenylmethane diisocyanate, 2,4-tolylene diisocyanate and 2,6-tolylene diisocyanate; $R^2$ represents the residue of a monoisocyanate compound selected from the group consisting of cyclohexyl isocyanate, phenyl isocyanate and hexamethylene isocyanate; and n represents an integer ranging from 2 to 30.

The stoichiometric coefficient n represents the average degree of polymerization in the above formula and should not be less than 2. This is because such a low polymerization degree, in other words, an insufficient number of carbodiimide groups, cannot attain the desirable reactivity of the carbodiimide compound for the present invention. On the other hand, an average degree of polymerization greater than 30 is also undesirable. This is because the reaction product will solidify or gel in the synthesis of the carbodiimide.

The carbodiimide compound of the present invention may be water soluble or self-emulsifiable. Examples of such a carbodiimide compound include a compound represented by the general formula (2) shown below, in which a hydrophilic segment is introduced to the end of the chain. Such carbodiimide compound can be used for the present invention by dissolving it in an aqueous solvent or making it self-emulsify in an aqueous solvent.

$$Z—OOC—NH—(R^3—NCN)_n—R^3—NH—COO—Z \qquad (2)$$

wherein $R^3$ represents the residue of a diisocyanate compound selected from the group consisting of m-tetramethylxylylene diisocyanate, p-tetramethylxylylene diisocyanate, 4,4'-dicyclohexylmethane diisocyanate and isophorone diisocyanate; Z represents a hydrophilic segment; and n represents an integer ranging from 2 to 30.

The stoichiometric coefficient n represents the average degree of polymerization in the above formula and should not be less than 2. This is because such a low polymerization degree, in other words, insufficient number of carbodiimide groups, cannot attain the desirable reactivity of the carbodiimide compound for the present invention. On the other hand, an average degree of polymerization greater than 30 is also undesirable. This is because the reaction product will solidify or gel in the synthesis of the carbodiimide. The value of n is a major factor for determining whether the carbodiimide compound is water-soluble or self-emulsifiable.

The hydrophilic segment represented by Z in the above formula is not specifically restricted, and examples of the segments shown below are preferably used.

a) An example of the anionic segment represented by Z is the residue of an alkyl sulfonate salt having at least one reactive hydroxyl group and is represented by the general formula (3) shown below. Specific examples of the alkyl sulfonate salt include sodium hydroxyethanesulfonate and sodium hydroxypropanesulfonate, and sodium hydroxypropanesulfonate is preferable.

$$R^5—SO_3—R^4—OH \qquad (3)$$

wherein $R^4$ represents an alkylene group having 1 to 10 carbon atoms; and $R^5$ represents an alkaline metal.

b) An example of the cationic segment represented by Z is a quarternary salt of the residue of dialkylamino alcohol represented by the general formula (4) shown below. Specific examples of the dialkylamino alcohol include 2-dimethylamino ethanol, 2-diethylamino ethanol, 3-dimethylamino-1-propanol, 3-diethylamino-1-propanol, 3-diethylamino-2-propanol, 5-diethylamino-2-propanol and 2-(di-n-butylamino) ethanol, and 2-dimethylamino ethanol is preferable.

$$(R^6)_2—N—R^7—OH \qquad (4)$$

wherein $R^6$ represents lower alkyl group having 1 to 4 carbon atoms; and $R^7$ represents alkylene group or oxyalkylene group having 1 to 10 carbon atoms.

The hydrophilic segment derived from the dialkylamino alcohol described above is introduced by reacting the end carbodiimide of the isocyanate and the dialkylamino alcohol and quarternarizing by a known quarternarizing agent, such as dimethyl sulfate and methyl p-toluenesulfonate. The hydrophilic segment is represented by the general formula (5) shown below.

$$(R^6)_2—\underset{\underset{R'}{|}}{N}—R^7 \qquad (5)$$

wherein $R^6$ and $R^7$ are the same as that in formula (4); and R' is a group derived from the quarternarizing agent.

c) An example of the nonionic segment represented by Z is the residue of an alkoxy end-capped poly(alkylene oxide) having at least one reactive hydroxyl group per molecule represented by the general formula (6) shown below. Specific examples of the poly(alkylene oxide) include poly(ethylene oxide) monomethyl ether, poly(ethylene oxide) monoethyl ether, poly(ethylene oxide)/poly(propylene oxide) monomethyl ether and poly(ethylene oxide)/poly(propylene oxide) monoethyl ether, and poly(ethylene oxide) monomethyl ether is preferable.

$$R^8—(O—CHR^9—CH_2)_m—OH \qquad (6)$$

wherein $R^8$ represents a lower alkyl group having 1 to 4 carbon atoms; $R^9$ represents hydrogen atom or methyl group; and m is an integer ranging from 4 to 30.

The chemical formula weight of the carbodiimide group-containing compound (B) per 1 mole of carbodiimide group preferably ranges from 300 to 600 and more preferably from 350 to 550. A chemical formula weight of less than 300 may result in excessively dense cross-linking of the compound to cause insufficient abrasion resistance of the sized fiber. On the other hand, a chemical formula weight greater than 600 may result in insufficient reactivity of the compound to fail to attain a sufficient effect of the present invention.

Water (C) is used as the solvent to dissolve or disperse the polyamide (A) and carbodiimide group-containing compound (B) mentioned above. Water from various sources including tap water, softened water, industrial water, ion-exchanged water and purified water may be used, and softened water, ion-exchanged water and purified water are preferable.

Sizing Agent for Reinforcement Fiber

The sizing agent for a reinforcement fiber of the present invention is prepared by dissolving the polyamide (A) and carbodiimide group-containing compound (B) in an aqueous medium or emulsifying them in water.

The average particle size of the emulsified compounds is preferably smaller than 10 μm, more preferably smaller than 5 μm, and further more preferably smaller than 2 μm. An average particle size greater than 10 μm may make the sizing agent unstable and impracticable to result in nonuniform application on reinforcement fiber and separation within several days. The average particle size mentioned herein is the average value calculated from the particle size distribution determined by a laser diffraction-scattering particle size analyzer (LA-910, manufactured by Horiba Ltd.).

The sizing agent of the present invention contains water as an essential component in order to secure the safety of workers handling the sizing agent, prevent disasters including fire and prevent environmental pollution. In other words, the sizing agent contains water as a main solvent. Organic solvents, such as methyl alcohol, ethyl alcohol, isopropyl alcohol, acetone and methylethyl ketone may be used in so far as such solvents do not deteriorate the effect of the present invention.

The components constituting the sizing agent of the present invention other than those mentioned above include various surfactants, lubricants, antistatic agents, antiseptics, penetrants, antioxidants, frame retardants, antibacterial agents, nucleating agents and defoamers. One of or a combination of at least two of these agents may be used.

Surfactants can be used as an emulsifier to facilitate emulsification of a resin, which is insoluble or hardly soluble in water, in the sizing agent of the present invention The surfactants are not specifically restricted, and any known surfactants selected from nonionic, anionic, cationic and amphoteric surfactants can be used. One of or a combination of at least two of the surfactants can be used.

The weight ratio of the polyamide (A) in the non-volatile components of the sizing agent preferably ranges from 70 to 99.9 wt %, more preferably from 80 to 99 wt % and further more preferably from 90 to 95 wt %. A weight ratio of the polyamide less than 70 wt % may inhibit the sizing agent from imparting sufficient cohesion to fiber, while a weight ratio higher than 99.9 wt % may result in an insufficient amount of the carbodiimide group-containing compound (B) in the sizing agent to cause poor bonding between the sized fiber and a matrix resin.

The non-volatile components of the sizing agent of the present invention means the residue after heating the sizing agent at 105° C. to remove the solvent and heating to constant weight.

The weight ratio of the carbodiimide group-containing compound (B) to the polyamide (A), B:A, preferably ranges from 0.1 to 30 wt %, more preferably from 1 to 20 wt % and further more preferably from 5 to 15 wt %. A weight ratio less than 0.1 wt % may make the sizing agent fail to attain sufficient bonding between the sized fiber and a matrix resin, while a weight ratio higher than 30 wt % may cause insufficient abrasion resistance of the sized fiber.

The concentration of the non-volatile components in the sizing agent for reinforcement fiber of the present invention is not specifically restricted, and the concentration is selected by considering the stability of aqueous solution or dispersion of the sizing agent and the optimum viscosity for handling the sizing agent. For a desirable transportation cost of the sizing agent, the weight ratio of the non-volatile components in the sizing agent preferably ranges from 10 to 60 wt %, more preferably from 15 to 60 wt % and further more preferably from 20 to 50 wt %.

The weight ratio of the total of the water and non-volatile components in the sizing agent for reinforcement fiber is preferably at least 90 wt %, more preferably at least 95 wt %, further more preferably at least 99 wt %, and most preferably 100 wt %. A sizing agent containing water and non-volatile components in an amount lower than 90 wt %, in other words, containing 10 wt % or more of organic solvents and other low-boiling-point compounds, which evaporate in heat treatment without remaining on the fiber surface, is not preferable in consideration of the safety of workers handling the sizing agent and prevention of environmental pollution.

Reinforcement Fiber Strand and Production Process Thereof

The reinforcement fiber strand of the present invention is produced by applying the sizing agent for reinforcement fiber described above to base synthetic fiber strands, and is used to reinforce thermosetting or thermoplastic matrix resins. The reinforcement fiber strand of the present invention has excellent bonding performance to thermosetting or thermoplastic matrix resins. In addition, the sizing agent applied thereon imparts good cohesion and abrasion resistance to the fiber strands to prevent fiber strand breakage and fluffs in the manufacturing process of the reinforcement fiber strand, and to prevent quality loss of the fiber strands and problems in the manufacturing process.

The amount of the non-volatile components of the sizing agent applied to base synthetic fiber strands can be optionally selected to attain desirable properties of the resultant reinforcement fiber strand, and a preferable amount ranges from 0.1 to 20 wt % of the base synthetic fiber strand. For continuous synthetic fiber strands, the amount preferably ranges from 0.1 to 10 wt % and more preferably from 0.5 to 5 wt %. For synthetic fiber strands cut into a certain length, the amount preferably ranges from 0.5 to 20 wt % and more preferably from 1 to 10 wt %.

An insufficient amount of the sizing agent on a synthetic fiber strand may result in a poor effect of the present invention for achieving uniform size application on fiber and good bonding between the sized synthetic fiber strand and a matrix resin. In addition, an insufficient amount of the sizing agent on a reinforcement fiber strand may fail to impart sufficient cohesion to the synthetic fiber strand to cause poor handling property of the fiber strand. On the other hand, an excessive amount of the sizing agent on a synthetic fiber strand is not advantageous. This is because such a sized synthetic fiber strand may become too rigid and cause problems, such as a poor handling property and insufficient impregnation with a matrix resin in molding a fiber-reinforced composite material.

The process of producing the reinforcement fiber strand of the present invention comprises the steps of preparing a treatment liquid comprising the sizing agent wherein the non-volatile components constitutes 0.5 to 10 wt % of the treatment liquid and the total of water and the non-volatile components constitutes at least 90 wt % of the treatment liquid; and applying the treatment liquid to a base synthetic fiber strand wherein the base synthetic fiber strand is applied with 0.1 to 20 wt % of the non-volatile components of the treatment liquid.

The amount of the non-volatile components in the treatment liquid prepared preferably ranges from 1 to 10 wt % and more preferably from 2 to 5 wt %. The total amount of the water and non-volatile components in the liquid is at least 95 wt %, more preferably at least 99 wt % and most preferably 100 wt %.

A preferable amount of the non-volatile components applied to the base synthetic fiber strand is as mentioned in the previous paragraph. The method for applying the sizing agent to a base synthetic fiber strand is not specifically restricted, and any known methods, such as application with kiss rolls, dipping rollers or spraying may be employed. Of those methods, application with dipping rollers is preferable to uniformly apply the sizing agent onto a base synthetic fiber strand.

The drying method for the sized synthetic fiber strand is not specifically restricted, and the sized synthetic fiber strand can be heated and dried with heater rollers, hot air, or hot plates.

For applying the sizing agent of the present invention to a base synthetic fiber strand, all the components of the sizing agent may be blended before applying to the base synthetic fiber strand, or the components may be separately applied to the base synthetic fiber strand in two or more stages. In addition, thermosetting resins, such as epoxy resins, vinyl ester resins and phenol resins, and/or thermoplastic resins, such as urethane resins, polyester resins, nylon resins and acrylic resins other than the polymer components used in the present invention may be applied to a base synthetic fiber strand in an amount which does not deteriorate the effect of the present invention.

The reinforcement fiber strand of the present invention is used as the reinforcement fiber for composite materials which contain thermosetting resins or thermoplastic resins as a matrix resin. The form of the reinforcement fiber may be continuous filament or short fibers cut into a given length.

The synthetic fiber used as the (base) synthetic fiber strand to be applied with the sizing agent of the present invention includes inorganic fibers, such as carbon fiber, glass fiber and ceramic fiber, and organic fibers, such as aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber. At least one fiber selected from carbon fiber, aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber is preferable, and carbon fiber is more preferable for achieving desirable properties of the resultant fiber-reinforced composite material.

Fiber-Reinforced Composite Material

The fiber-reinforced composite material of the present invention comprises a thermosetting matrix resin or thermoplastic matrix resin and the synthetic fiber strand mentioned above as the reinforcement fiber. The synthetic fiber strand applied with the sizing agent of the present invention has good compatibility with the matrix resin to attain good bonding between the fiber strand and the matrix resin of the resultant fiber-reinforced composite material.

The thermosetting matrix resin mentioned herein means a matrix resin comprising thermosetting resins, and may contain one or more thermosetting resins. The thermosetting resins are not specifically restricted and include epoxy resins, phenol resins, unsaturated polyester resins, vinyl ester resins, acrylic resins, cyanate ester resins and polyimide resins.

The thermoplastic matrix resin mentioned herein means a matrix resin comprising thermoplastic resins and may contain one or more thermoplastic resins. The thermoplastic resins are not specifically restricted, and include polyolefin resins, polyamide resins, polycarbonate resins, polyester resins, polyacetal resins, ABS resins, phenoxy resins, polymethylmethacrylate resins, polyphenylene sulfide resins, polyether imide resins and polyether ketone resins. Of those resins, polyamide resins are preferable because of their effect of improving the bonding between a matrix resin and the fiber applied with the sizing agent of the present invention. The polyamide resins mentioned herein are polymers synthesized from a dibasic fatty acid and diamine, ω-amino acid, lactam or derivatives thereof, and have a plurality of amide groups in the main chain. The polyamide resins include homopolymers and copolymers, and may be modified by introducing substituents to the main chain or chain ends.

A part of or whole of the thermo-setting matrix resin or thermoplastic matrix resin can be modified in order to improve bonding between the matrix resin and a synthetic fiber strand.

The method for manufacturing the fiber-reinforced composite material is not specifically restricted, and known methods, such as injection molding of a compound or pellet containing continuous fiber or chopped fiber, stamping with a UD (ultra high molecular weight polyethylene) sheet or fabric sheet and filament winding, may be employed.

The amount of synthetic fiber strand contained in the fiber-reinforced composite material is not specifically restricted, and is optionally selected according to the variant and form of the synthetic fiber and the variant of matrix resins. The amount of the matrix resin in the composite material preferably ranges from 5 to 70 wt % and more preferably from 20 to 60 wt % of the resultant fiber-reinforced composite material.

EXAMPLES

The present invention is specifically described with the following examples, though the present invention is not restricted within the scope of those examples. In the following Examples and Comparative examples, "%" means "wt %" and "part(s)" means "part(s) by weight" unless otherwise specified. The properties of the materials were tested or determined in the procedures described below.

Viscosity

The viscosity of the polyamide (A) was determined at 150° C. with a cone plate viscometer (ICI Cone and Plate Viscometer, manufactured by Research Equipment Ltd.).

Fiber Cohesion

Fiber samples were prepared by applying each of the sizing agent (diluted to 3% concentration with water) to carbon fiber (by 1% of fiber weight). Ten pieces (5 mm long) from each fiber sample were cut with a box-cutter and visually inspected to determine whether the pieces were loosened by cutting or not. The loosening of the pieces was evaluated according to the following criteria where "A" and "B" were determined to be acceptable.

A: Two or less of pieces were loosened
B: Three or four of pieces were loosened
C: Seven to five pieces were loosened
D: Eight or more of pieces were loosened Abrasion Resistance A carbon fiber precursor strand sample (12K) was set on a TM type yarn abrasion tester (TM-200, manufactured by Daiei Kagaku Seiki) and driven reciprocally on three smooth-finished chromium-plated stainless needles arranged in a zigzag configuration. The carbon fiber precursor strand was subjected to 1000 abrasion passes by the needles (at 300 times abrasion per minute) with a 50-g yarn tension. After the abrasion test, the fluffs generated on the precursor strand were visually inspected and evaluated according to the following criteria where "A" and "B" were determined to be acceptable.

A: No fluffs were found as in the strand before the abrasion test
B: Several fluffs were found to still allow for good abrasion resistance of the strand
C: A few more fluffs were found to result in somewhat poor abrasion resistance of the strand
D: Many fluffs were found, and the strand often broke to result in poor abrasion resistance Dynamic Surface Tension (Representing Uniformity of a Sizing Agent on Fiber)

A sizing agent was diluted with water into an aqueous emulsion containing 3 wt % of non-volatile components. The dynamic surface tension of the emulsion was measured with a bubble pressure tensiometer (BP-2, produced by Krüss) at 25° C. by blowing bubbles into the emulsion at a rate ranging from one bubble per 20 to 1000 milliseconds (at the bubble plate), and the dynamic surface tension measured by forming one bubble per 100 milliseconds (at the bubble plate) was determined. The result was evaluated according to the following criteria where "A" and "B" were determined to be acceptable.

A: Dynamic surface tension smaller than 64.0 mN/m
B: Dynamic surface tension at least 64.0 mN/m and smaller than 66.0 mN/m
C: Dynamic surface tension at least 66.0 mN/m and smaller than 68.0 mN/m
D: Dynamic surface tension of 68.0 mN/m or higher Bonding The bonding between a sized synthetic fiber strand and matrix resin was evaluated by measuring their bonding strength via a microdroplet method with a device for measuring the interfacial properties of composite materials, HM 410 (manufactured by Toei Sangyo Co., Ltd.).

Carbon fiber filament was sampled from each of the carbon fiber strands produced in the following Examples and Comparative examples, and set on the device for measuring the interfacial properties of composite materials. A drop of molten polyamide resin (T-663, produced by Toyobo Co., Ltd.) was placed on the carbon fiber filament set on the device. The carbon fiber filament with the drop of the resin was taken out of the device and cooled well at room temperature for preparation of a sample for determining the bonding strength between the carbon fiber filament and the resin. The cooled sample was again set on the device, and the drop was pinched with the blades of the device. Then the carbon fiber filament on the device was driven at a speed of 0.06 mm/min to determine the maximum pullout load, F, required for pulling the drop out from the carbon fiber filament.

The interfacial shearing strength, τ, was calculated by the following formula to evaluate the bonding between the carbon fiber filament and the polyamide resin:

Interfacial shearing strength, τ (MPa)=$F/\pi dl$ where F is the maximum pullout load, d is the diameter of the carbon fiber filament, and l is the drop diameter along the pulling direction. The result was evaluated according to the following criteria where "A" and "B" were determined to be acceptable.

A: Interfacial shearing strength of at least 50.0 MPa
B: Interfacial shearing strength of at least 45.0 MPa and smaller than 50.0 MPa
C: Interfacial shearing strength of at least 35.0 MPa and smaller than 45.0 MPa
D: Interfacial shearing strength smaller than 35.0 MPa The components shown below (A-1 to C-1) were blended in the ratios (parts by weight) described in Tables 1 and 2 for preparation of sizing agents for the reinforcement fibers of Examples 1 to 11 and Comparative examples 1 to 12. The molecular weight mentioned below means the number average molecular weight of the polymers unless otherwise specified.

A-1: Water-soluble polyamide having a melt viscosity of 4000 mPa·s at 150° C.
A-2: Water-soluble polyamide having a melt viscosity of 1000 mPa·s at 150° C.
A-3: Water-soluble polyamide having a melt viscosity of 8000 mPa·s at 150° C.
A-4: Water-insoluble polyamide having a melt viscosity of 800 mPa·s at 150° C.
B-1: Polycarbodiimide emulsion (active content 40 wt %, having a viscosity of 10 mPa·s and a chemical formula weight of 445 per 1 mole of carbodiimide group)
B-2: Polycarbodiimide aqueous solution (active content 40 wt %, having a viscosity of 100 mPa·s and a chemical formula weight of 410 per 1 mole of carbodiimide group)
C-1: Ion-exchanged water
X-1: Liquid epoxy resin (having a viscosity of 13500 mP·s at 25° C.)
X-2: Polyamide having a melt viscosity of 20000 mPa·s at 150° C.
X-3: Water-soluble polyamide having a melt viscosity of 80 mPa·s at 150° C.

Synthesis of Polyamide

Synthesis Example A-1

In a vessel equipped with an agitation device, 112 parts of polyether diamine (M.W. 400), 30.7 parts of adipic acid, 45 parts of ε-caprolactam and 0.6 parts of p-toluene sulfonic acid were charged and subjected to condensation reaction at 220° C. for 14 hours with agitation to obtain a polyamide (A-1). The polyamide (A-1) had a melt viscosity of 4000 mPa·s at 150° C.

Synthesis Example A-2

A polyamide (A-2) was obtained in the same manner as that of Synthesis Examples A-1 except that the reaction temperature was changed into 200° C. The polyamide (A-2) had a melt viscosity of 1000 mPa·s at 150° C.

Synthesis Example A-3

A polyamide (A-3) was obtained in the same manner as that of Synthesis Example A-1 except that the amount of the adipic acid was changed into 28.0 parts. The polyamide (A-3) had a melt viscosity of 8000 mPa·s at 150° C.

Synthesis Example A-4

In an autoclave equipped with an agitation device, 120 parts of nylon 6/66/12 copolymer, 179.6 parts of water and 0.4 parts of sodium hydroxide were charged and the temperature was raised to 150° C. with agitation under nitrogen reflux. The temperature in the autoclave was kept at 150° C. and the content was agitated for 30 min. Then, the content was cooled down to 50° C. and taken out from the autoclave to obtain an aqueous dispersion of a polyamide resin (A-4) that was an aqueous emulsion containing 40 wt % of non-volatile components. The polyamide resin contained in the aqueous dispersion of polyamide resin (A-4) had a melt viscosity of 800 mPa·s at 150° C.

Synthesis Example X-2

In a reactor equipped with an agitation device, 1000 parts of polyether diamine (M.W. 900), 159 parts of adipic acid, 375 parts of ε-caprolactam and 23 parts of phosphoric acid aqueous solution were charged. After completely purging the reactor with nitrogen, the content was polymerized at 230° C. for 4 hours. Then polymerization was conducted under reduced pressure for 1.5 hours to obtain a polymer. The pressure in the reactor was then reduced over an hour at 230° C. by a pressure-regulation device and polymerization was conducted at 230° C. for 0.5 hours to obtain a polyamide (X-2). The polyamide (X-2) had a melt viscosity of 20000 mPa·s at 150° C.

Synthesis Example X-3

A polyamide (X-3) was obtained in the same manner as that of Synthesis Example A-1 except that the reaction time was changed into 1 hour. The polyamide (X-3) had a melt viscosity of 80 mPa·s at 150° C.

Examples 1 to 11 and Comparative Examples 1 to 12

Sizing agents were prepared by blending the polyamides and polycarbodiimides produced in the Synthesis Examples mentioned above, water and other components in accordance with the weight ratios shown in Tables 1 and 2. The uniformity of the resultant sizing agents on fiber was evaluated in the method mentioned above.

Then, a carbon fiber strand (800 tex, 12000 filament count) free of sizing agents was immersed in and impregnated with one of the sizing agents, dried in hot air at 105° C. for 15 minutes, and made into a sized carbon fiber strand to which the non-volatile components of the sizing agent was applied in an amount of 1 wt % of the fiber weight. The abrasion resistance, fiber cohesion and bonding to matrix resin of the sized carbon fiber strand was evaluated by the methods mentioned above.

TABLE 1

| Examples | | | 1 | 2 | 3 | 4 | 5 | 6 | 7 | 8 | 9 | 10 | 11 |
|---|---|---|---|---|---|---|---|---|---|---|---|---|---|
| Non-volatile components (wt %) | Polyamides (A) | (A-1) Water-soluble polyamide (viscosity: 4000) | 20 | | | | 20 | 20 | 20 | 20 | 40 | | |
| | | (A-2) Water-soluble polyamide (viscosity: 1000) | | 20 | | | | | | | | 20 | |
| | | (A-3) Water-soluble polyamide (viscosity: 8000) | | | 20 | | | | | | | | 20 |
| | | (A-4) Emulsified water-insoluble polyamide (viscosity: 800) | | | | 20 | | | | | | | |
| | Carbodiimide group-containing compounds (B) | (B-1) Polycarbodiimide 1 | 2 | 2 | 2 | 2 | 4 | 1 | 0.5 | 1 | 4 | | |
| | | (B-2) Polycarbodiimide 2 | | | | | | | | 1 | | 2 | 2 |
| Water (C.) | | (C-1) Ion-exchanged water | 78 | 78 | 78 | 78 | 76 | 79 | 79.5 | 78 | 56 | 78 | 78 |
| Ratio of Polyamide (A) in non-volatile components (wt %) | | | 90.9 | 90.9 | 90.9 | 90.9 | 83.3 | 95.2 | 97.6 | 90.9 | 90.9 | 90.9 | 90.9 |
| Weight ratio of Compound (B) to Polyamide (A) (%) | | | 10.0 | 10.0 | 10.0 | 10.0 | 20.0 | 5.0 | 2.5 | 10.0 | 10.0 | 10.0 | 10.0 |
| Performance | | Abrasion resistance | A | A | B | A | B | A | A | A | A | A | B |
| | | Fiber cohesion | A | B | A | B | A | A | B | A | A | B | A |
| | | Uniformity on fiber | 63.5 | 62.8 | 64.2 | 63.1 | 60.5 | 63.8 | 63.9 | 63.6 | 63.5 | 62.5 | 64.0 |
| | | | A | A | B | A | A | A | A | A | A | A | B |
| | | Bonding | 55.3 | 49.1 | 56.1 | 47.4 | 58.3 | 47.8 | 45.2 | 53.9 | 55.4 | 48.1 | 50.6 |
| | | | A | B | A | B | A | B | B | A | A | B | A |

TABLE 2

| Comparative Examples | | | 1 | 2 | 3 | 4 | 5 | 6 | 7 | 8 | 9 | 10 | 11 | 12 |
|---|---|---|---|---|---|---|---|---|---|---|---|---|---|---|
| Non-volatile components (wt %) | Polyamides (A) | (A-1) Water-soluble polyamide (viscosity: 4000) | 20 | | | | | | | | | | | |
| | | (A-2) Water-soluble polyamide (viscosity: 1000) | | 20 | | | | | | | | | | |
| | | (A-3) Water-soluble polyamide (viscosity: 8000) | | | 20 | | | | | | | | | |
| | | (A-4) Emulsified water-insoluble polyamide (viscosity: 800) | | | | 20 | | | | | | | | |
| | Carbodiimide group-containing compounds (B) | (B-1) Polycarbodiimide 1 | | | | | 20 | | | | | 2 | 2 | 2 |
| | | (B-2) Polycarbodiimide 2 | | | | | | 20 | | | | | | |
| | Other resins (X) | (X-1) Epoxy resin | | | | | | | | 20 | | 20 | | |
| | | (X-2) Polyamide (viscosity: 20000) | | | | | | | | | 20 | | 20 | |
| | | (X-3) Polyamide (viscosity: 80) | | | | | | | | | | | | 20 |
| Water (C.) | | (C-1) Ion-exchanged water | 80 | 80 | 80 | 80 | 80 | 80 | 100 | 80 | 80 | 78 | 78 | 78 |
| Ratio of Polyamide (A) in non-volatile 3s (wt %) | | | 100 | 100 | 100 | 100 | 0 | 0 | — | 0 | 0 | 0 | 0 | 0 |
| Weight ratio of Compound (B) to Polyamide (A) (%) | | | 0 | 0 | 0 | 0 | — | — | — | — | — | — | — | — |
| Performance | | Abrasion resistance | A | A | B | A | D | D | D | D | D | D | D | A |
| | | Fiber cohesion | A | B | A | A | A | B | D | A | B | A | A | D |
| | | Uniformity on fiber | 63.7 | 61.0 | 64.2 | 60.2 | 56.1 | 59.6 | 72.0 | 66.8 | 69.3 | 66.1 | 68.2 | 60.0 |
| | | | A | A | B | A | A | A | D | C | D | C | D | A |
| | | Bonding | 28.7 | 24.3 | 30.6 | 23.9 | 49.5 | 39.1 | 37.3 | 34.8 | 37.7 | 40.5 | 56.1 | 40.2 |
| | | | D | D | D | D | B | C | C | D | C | C | A | C |

As described in Tables 1 and 2, the sizing agents of the Examples simultaneously exhibited excellent abrasion resistance and cohesion of sized fiber, uniform application on fiber and good bonding between sized fiber and matrix resin. On the other hand, the sizing agents of the Comparative Examples failed to satisfy one or more of the above performance parameters required of sizing agents.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:

1. A sizing agent for reinforcement fiber, wherein the sizing agent comprises a polyamide (A), a carbodiimide group-containing compound (B) and water (C);
   wherein the polyamide (A) has a melt viscosity ranging from 100 to 10,000 mPa·s at 150 °C.; and
   wherein the compound (B) has at least two carbodiimide groups per molecule.

2. The sizing agent as claimed in claim 1, wherein the polyamide (A) is a water-soluble polyamide.

3. The sizing agent as claimed in claim 1, wherein the polyamide (A) is a condensation-polymerization product of an amine and a carboxylic acid and has an oxyalkylene group.

4. The sizing agent as claimed in claim 1, wherein the weight ratio of the carbodiimide group-containing compound (B) to the polyamide (A), B:A, ranges from 1 to 30 wt %.

5. The sizing agent as claimed in claim 1, wherein the chemical formula weight of the carbodiimide group-containing compound (B) ranges from 300 to 600 per 1 mole of the carbodiimide group.

6. A reinforcement fiber strand manufactured by applying the sizing agent for reinforcement fiber as claimed in claim 1 to a base reinforcement fiber strand.

7. The reinforcement fiber strand as claimed in claim 6, wherein the base reinforcement fiber is carbon fiber.

8. A fiber-reinforced composite material comprising a matrix resin and the reinforcement fiber strand as claimed in claim 6.

9. The fiber-reinforced composite material as claimed in claim 8, wherein the matrix resin is a thermoplastic resin.

10. A fiber-reinforced composite material comprising a matrix resin and the reinforcement fiber strand as claimed in claim 7.

11. The fiber-reinforced composite material as claimed in claim 10, wherein the matrix resin is a thermoplastic resin.

* * * * *